Feb. 6, 1934.                H. C. REUTER                1,946,035
                                GRATING
                          Filed Sept. 12, 1932
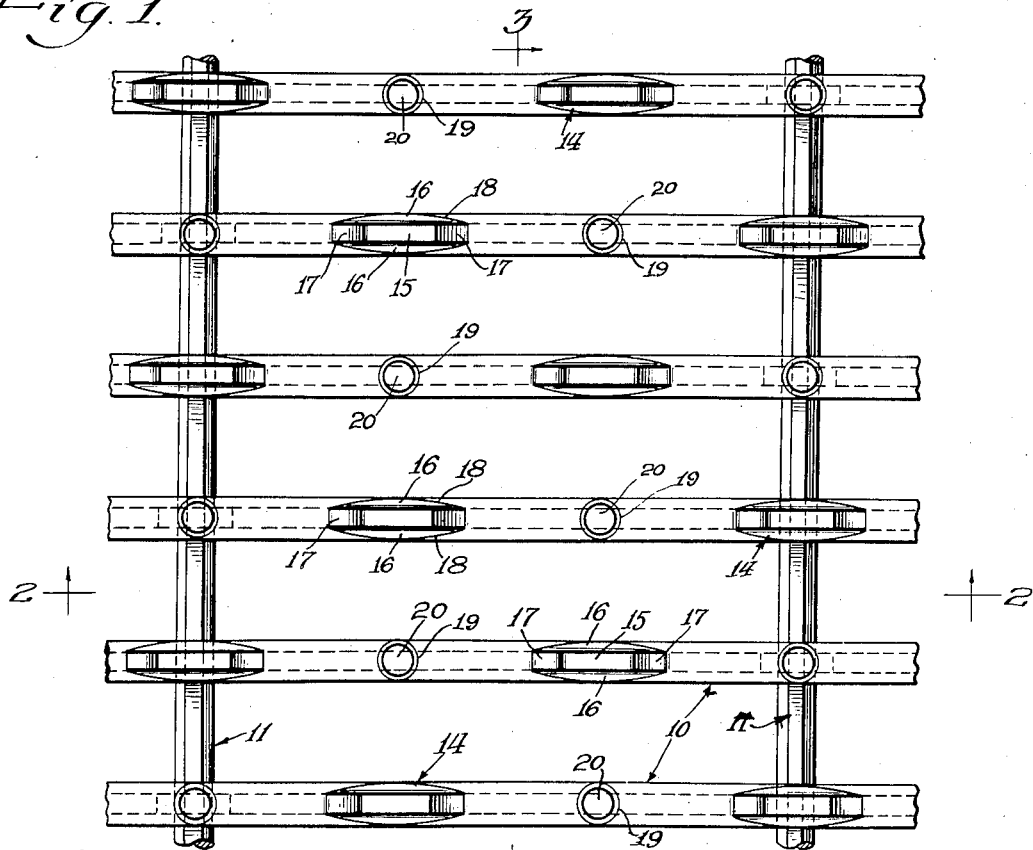
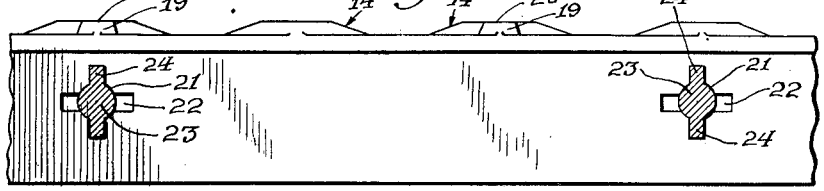
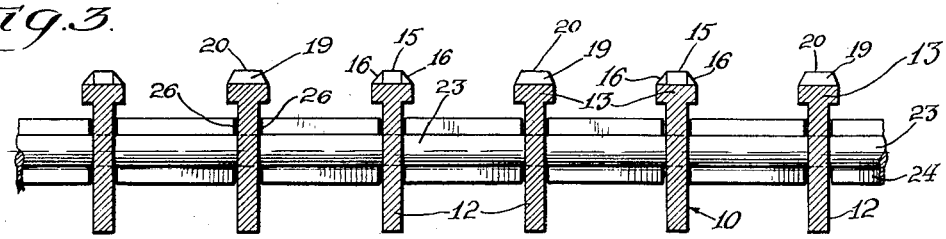
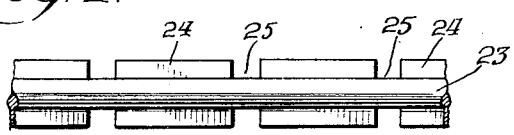
Inventor:
Henry C. Reuter,
By Bertha L. MacGregor
Attorney Patented Feb. 6, 1934

1,946,035

UNITED STATES PATENT OFFICE 1,946,035

GRATING

Henry C. Reuter, Chicago, Ill.

Application September 12, 1932
Serial No. 632,750

4 Claims. (Cl. 94—30)

This invention relates to metal grating suitable for use in floor gratings, stair treads and the like.

The main object of the invention is to produce a grating provided with a safe tread, adapted for all kinds of indoor and outdoor installations, and which provides for the maximum passage of light and air.

Another object is to produce grating in which longitudinal and transverse bars are rigidly held together as intended without the use of rivets or welding, the latter being objectionable because of its deleterious effect on the metal.

Another object is to produce grating which is attractive in appearance, self-cleaning and devoid of acute angles and projections which collect dirt and interfere with the passage of light and air.

The grating of my invention is easy to walk on, and because of the tread formation resists slipping. All the longitudinally extending bars are of one depth and are load-carrying.

Other objects and advantages will appear from the following specification.

In the drawing:

Fig. 1 is a plan view of floor grating embodying my invention.

Fig. 2 is a sectional view taken on the line 2—2 of Fig. 1, showing one of the longitudinally extending bars in side elevation.

Fig. 3 is a transverse sectional view taken on the line 3—3 of Fig. 1.

Fig. 4 is a side elevation of one of the transversely extending bars of the grating.

In that embodiment of the invention shown in the drawing, longitudinally extending bars are indicated at 10 and transverse bars at 11. The bars 10 are preferably T-shaped in transverse section, comprising a vertically disposed, relatively narrow strip 12 and a wider tread portion 13, as best shown in Fig. 3.

On the upper surface of the tread portion 13 are a plurality of equi-distantly spaced lugs or projections 14, extending longitudinally of the bars 10, each having a relatively flat, elongated and rectangularly shaped top surface 15 narrower than the tread 13 and merging with downwardly inclined side surfaces 16, 16, and end surfaces 17, 17. The junctures of the surfaces 16, 16 with the top of the tread 13 are indicated by the curved lines 18, 18.

The bars 10 are preferably arranged so that the lugs 14 on adjacent bars 10 are not opposite each other, but the lugs 14 on alternate bars 10 are opposite each other.

Between the lugs 14, the bars 10 are provided with raised buttons 19 or truncated cones of the same height as the lugs 14. The diameter at the base is about equal to the width of the tread surface 13. The top 20 of the button is flat, its diameter being somewhat less than the diameter of the base of the button.

The non-uniformity of the projections 14, 19 rising from the tread surface 13 and their form result in providing a safe, skid-resisting tread.

The part 12 of the bar 10 is horizontally apertured at equi-distantly spaced points, the apertures being centrally circular in form with lateral, rectangularly shaped recesses communicating with the circular portion. In Fig. 2 the circular part of the aperture is indicated at 21 and the laterally disposed recesses at 22.

The transverse bars 11 comprise a rod 23 and oppositely disposed flanges 24 identical in cross section to the shape of the aperture 21, 22 in the bar 10. The length of the flanges 24 is equal to the predetermined space between the bars 10, and the said flanges 24 are spaced from each other, end to end, at 25, sufficiently to accommodate the body 12 of the bar 10 between them.

To asemble the grating, the transverse bars 11 are inserted through the apertures 21, 22 of any desired number of longitudinally extending, parallel bars 10, the flanges 24 being horizontally disposed when the bars 11 are placed into their initial position, with the spaces 25 aligned with the bars 10. Thereupon, the transverse bars 11 are turned 90 degrees so that the flanges are vertically disposed, as shown in the drawing, in the final asembled position of the parts.

The ends of the spaced apart flanges form shoulders 26 which abut the sides of the bars 10 and retain them in predetermined, parallel, spaced relation. The frictional engagement between the parts, especially after they have been coated with a suitable protective coating, is such that the parts are maintained rigidly in their intended positions. A few of the contacting surfaces on bars 10 and 11 in a grating section may be welded so that vibration, heavy loading or jarring cannot loosen them. The transverse bars act as spacers and connectors for the longitudinal bars.

The form and arrangement of the bars 10 and 11 is such that the grating is practically self-cleaning and a maximum of light and ventilation is insured.

Changes may be made in details of construction without departing from the scope of my invention and I do not intend to be limited to the exact form shown and described, except as set forth in the appended claims.

I claim:—

1. A metallic grating comprising a plurality of longitudinally extending bars having relatively narow tread surfaces, and a plurality of transverse bars connecting the longitudinal bars together and having their upper surfaces located below the tread surfaces of the longitudinal bars, the said tread surfaces of said longitudinal bars being provided with spaced apart, raised lugs having elongated rectangularly shaped upper faces and downwardly inclined convex side surfaces.

2. A metallic grating comprising a plurality of longitudinally extending bars having relatively narrow tread surfaces, and a plurality of transverse bars connecting the longitudinal bars together and having their upper surfaces located below the tread surfaces of the longitudinal bars, the said tread surfaces of said longitudinal bars being provided with spaced apart, raised lugs having elongated, rectangular shaped upper faces and truncated cone shaped projections located between the said lugs, the lugs on one longitudinal bar being located opposite the truncated cone shaped projections of an adjacent bar.

3. A metallic grating comprising a plurality of tread surfaces, and a plurality of transverse bars connecting the longitudinal bars together and having their upper surfaces located below the tread surfaces of the longitudinal bars, the said tread surfaces of said longitudinal bars being provided with spaced apart, raised lugs having elongated, rectangularly shaped upper faces and truncated cone shaped projections located between the said lugs, the lugs and projections having inclined sides of the same height.

4. A metallic grating comprising a plurality of longitudinally extending bars each having a tread surface, means securing the bars in fixed spaced relationship, the top surface of said bars being provided with lugs having convex side surfaces which are upwardly inclined to define relatively narrow tread surfaces raised above the top surfaces of said bars.

HENRY C. REUTER.